UNITED STATES PATENT OFFICE

1,943,170

AZO-DYESTUFFS AND PROCESS OF MAKING SAME

Friedrich Felix, Basel, Switzerland, assignor to firm Society of Chemical Industry in Basle, Basel, Switzerland No Drawing. Application May 8, 1933, Serial No. 670,035, and in Switzerland May 15, 1932

10 Claims.  (Cl. 260—90)

This invention relates to the manufacture of new dyestuffs by coupling a diazo-compound of the general formula

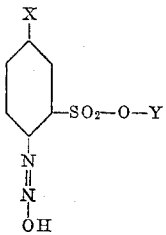

in which X represents an $NO_2$-group or an NH-acyl-group and Y an aromatic nucleus of the benzene series, with any coupling component, and if desired, cautiously treating the product with a reducing agent or saponifying agent. There are thus obtained dyestuffs of the general formula

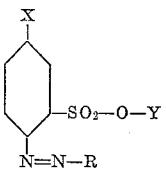

in which X represents $NO_2$, $NH_2$ or NH-acyl, Y an aromatic nucleus of the benzene series and R a residue of a coupling component.

According to the nature of the substituent X and the residue R dyestuffs of different shades are obtained, whereas the other properties, for instance the solubility, may depend on the nature of the residue Y. (This is the case, for example, when in the dyestuff molecule only this residue Y contains the sulfo-group).

If, for example, the residue R is such that the coupling component belongs to the kind known as yellow components, that is to say one which can be coupled with a diazo-compound, owing to the presence of a $COCH_2$-group, there is obtained a yellow to orange dyestuff. Such yellow components are, for example, derivatives of aceto-acetic acid, for instance an arylide of aceto-acetic acid, like aceto-acetic anilide, or a 5-pyrazolone, such as 1-phenyl-3-methyl-5-pyrazolone. Other coupling components which lead to yellow or orange and brown dyestuffs are substances like salicylic acid, the cresotinic acids, naphthol and β-naphthol-sulfonic acid. Particularly important are those dyestuffs derived from such coupling components as owe their coupling capacity to the presence of an amino- or substituted amino-group. Such dyestuffs are therefore aminoazo-dyestuffs. Among these are of special interest those which are derived from coupling components of the benzene series, such as dimethylaniline, diphenylamine, diphenylamine-carboxylic acids and sulfonic acids, ethylbenzylaniline, ethylbenzylaniline-sulfonic acids, or from coupling components of the naphthalene series, such as α- and β-naphthylamine, ethyl-α- or ethyl-β-naphthylamine and sulfonic acids and substitution products thereof, such as 1-phenyl- or tolyl-aminonaphthalene-8-sulfonic acid or 1-amino-5-hydroxy-naphthalene-7-sulfonic acid, 2-amino-8-hydroxy-naphthalene, 2-naphthylamine-6-sulfonic acid, 2-naphthylamine-5-hydroxy-7-sulfonic acid, 2-naphthylamine-8-hydroxy-6-sulfonic acid and their N-alkyl-, N-aralkyl- and N-aryl-substitution products. Very suitable among these products are the coupling components of the naphthalene series which, due to the presence of an NH-R-group in the 2-position (R=H, alkyl, aralkyl or aryl), couple in the 1-position.

The larger number of the said dyestuffs may be obtained in a single operation in that such diazotizing components as are of the general formula

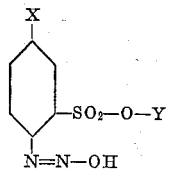

in which X represents an $NO_2$-group or an NH-acyl-group, are coupled with the aforesaid coupling components. By cautious reduction or cautious saponification of these dyestuffs they may be converted into dyestuffs in which X represents $NH_2$. It may also be advantageous to make the dyestuffs in which X represents NH-acyl by starting with diazotizing components in which X represents $NO_2$ and then converting the finished dyestuff by reduction of the $NO_2$-group and acylation into the dyestuff containing the NH-acyl group.

The new dyestuffs are yellow to red, brown and black powders which dissolve in water or, when no sulfo-group is present, in organic solvents to yellow to red, brown, violet and blue solutions. When they contain sulfo-groups they produce on wool or other animal fibres, such as silk or loaded silk, in an acid bath fast tints which may be characterized, in particular by their fastness to light and their fastness to washing. Among these dyestuffs must be especially mentioned those which are derived from β-naphthylamine or a derivative or substitution product thereof which contains one sulfonic acid group only, such as, for example N-ethyl-β-naphthylamine and sulfonic acids thereof, or 2-amino-8-hydroxynaphthalene-6-sulfonic acid and its N-alkyl-, N-aralkyl or N-aryl-derivatives as coupling components. The dyestuffs thus obtained dye wool in an acid bath red to violet and blue tints fast to light and washing. The non-sulfonated dyestuffs, which are insoluble in water, may be used for coloring varnishes, cellulose ester lacquers, artificial masses and the like.

Among the diazotizing components in question there stand out as diazotizable with difficulty the 1-amino-4-nitro-benzene-1-sulfonic acid-arylesters so far as they do not contain groups which produce solubility in water, such as a sulfonic acid group.

It has been found that they dissolve in concentrated sulfuric acid without saponification of the sulfonic acid-arylester and in these solutions may be diazotized by treatment with sodium nitrite or nitrosyl-sulfuric acid. When the sulfuric acid diazo-solution is poured into water, the new diazo-compound separates with good yield. For conversion into the dyestuff this is advantageously freed from excess of mineral acid by filtration.

The following examples illustrate the invention, the parts being by weight:—

EXAMPLE 1 a. *Manufacture of a diazo-compound of the general formula*

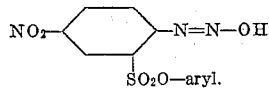

70 parts of sodium nitrite are dissolved in about 600 parts of concentrated sulfuric acid while cooling. The solution is then warmed to about 65° C. and then cooled to room temperature, whereupon there are introduced 294 parts of the pulverized phenol ester of para-nitraniline-ortho-sulfonic acid. When all has been introduced the mass is stirred for a short time and introduced into ice-water. The diazo-compound separates and may be filtered. In the condition in which it is thus obtained it may be used directly for the manufacture of the dyestuff. Other esters can be similarly diazotized. The diazotization may be conducted also in the presence of other acids, for example formic acid, acetic acid or the like.

b. *Manufacture of the dyestuff*

Into an aqueous, feebly acid suspension of the diazo-compound of the phenol ester of para-nitraniline-ortho-sulfonic acid, made as described under a there is introduced an exactly neutralized solution of 239 parts of 2-amino-8-hydroxynaphthalene-6-sulfonic acid and the whole is stirred until dyestuff formation is complete, which can be hastened, if desired, by addition of sodium acetate or the like. The dyestuff thus formed is filtered and washed until neutral. It is a blue powder which dissolves in water to a violet solution and dyes wool in an acid bath fast violet-blue tints. Its sodium salt corresponds to the formula

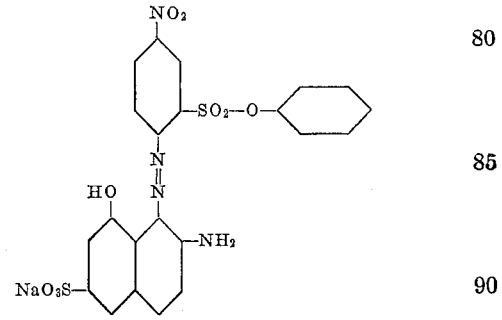

Similar dyestuffs may be obtained from other esters, for example those of chlorophenol, the cresols, nitrophenols, aminophenols, acylaminophenols, dihydroxybenzenemonoalkylethers, such as guaiacol, and the monomethylether of resorcinol or of hydroquinone or the like.

If other aminonaphthol-sulfonic acids, for example 2-amino-8-hydroxynaphthalene-3:6-disulfonic acid or 1-amino-5-hydroxynaphthalene-7-sulfonic acid, are used as coupling components there are obtained dyestuffs of similar tints and similar properties. Dyestuffs which are obtained by coupling the said diazo-compounds with acetoacetic-ester, aceto-acetic acid arylides or phenylmethyl-pyrazolones may be suitable for making yellow pigments, while blue pigments are obtainable by use of ethyl-α- or ethyl-β-naphthylamine or benzyl-α- or benzyl-β-naphthalamine. These pigments, which are insoluble in water, may be used for coloring lacquers, varnishes, artificial masses or the like.

The dyestuffs thus obtainable may be further changed and in particular the nitro-group may be reduced by known methods, whereby the dyestuff is changed essentially in its properties. The amino-group thus introduced may be acidylated whereby, as a rule, dyestuffs are obtained the dyeings of which are quite characteristically fast. These dyestuffs may also be obtained from the reduced acidylated esters.

EXAMPLE 2

410 parts of the sodium salt of the ester from para-cresol and para-nitraniline-ortho-sulfonic acid in which the para-cresol nucleus is sulfonated are diazotized in aqueous hydrochloric acid solution by addition of 69 parts of sodium nitrite. Into the diazo-suspension is introduced, while stirring, a neutral solution of 239 parts of 2-amino-8-hydroxynaphthalene-6-sulfonic acid and the mixture is stirred, if desired with addition of sodium acetate, until coupling is complete. The dyestuff may be separated by addition of sodium chloride. Its sodium salt corresponds to the formula

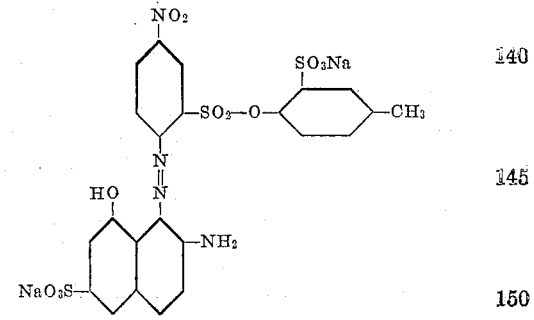

It is filtered and dried. It is a blue powder, soluble in water to a violet-blue solution and dyeing wool in an acid bath blue-violet tints.

There is obtained a considerably more sparingly soluble dyestuff having similar dyeing properties if, instead of 2-amino-8-hydroxynaphthalene-6-sulfonic acid 171 parts of ethyl-β-naphthylamine in the form of its hydrochloride or sulfate is used. This dyestuff dyes wool blue-violet tints of special fastness to washing. In this case also, other coupling components, for example those named in Example 1, may be used. The aforesaid ester from para-cresol and para-nitraniline-ortho-sulfonic acid, sulfonated in the para-cresol nucleus, may be made, for instance, by reaction of para-nitraniline-ortho-sulfonic acid chloride (which is itself obtainable by the reaction between para-nitraniline-ortho-sulfonic acid and a phosphorus halide, such as phosphorus trichloride, phosphorus pentachloride or phosphorus hydroxychloride) with para-cresol-orthosulfonic acid.

EXAMPLE 3 a. Manufacture of a diazotizing component of the formula

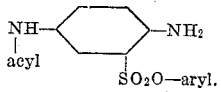

300 parts of the para-chlorophenol ester of para-nitraniline-ortho-sulfonic acid are introduced into a boiling mixture of 600 parts of iron powder and 2000 parts of alcohol containing some hydrochloric acid or acetic acid; the mixture is stirred until the reduction is complete. After working up in the usual manner there is obtained the para-phenylenediamine-sulfonic acid-chlorophenylester in the form of a nearly white powder. By acetylating in water with the aid of 102 parts of acetic anhydride the NH-group in the meta-position to the SO O-aryl residue is acetylated.

b. Manufacture of the dyestuff 340 parts of the acetyl-compound made as described under a are diazotized in the usual manner by addition of hydrochloric acid and 69 parts of sodium nitrite, and into the acid diazo-solution or suspension there is introduced a neutral solution of 239 parts of 2-amino-8-hydroxynaphthalene-6-sulfonic acid. When coupling is complete, which may be hastened by cautious addition of sodium acetate or the like, the dyestuff is filtered, if necessary after addition of sodium chloride, and then washed with a solution of sodium chloride and dried. Its sodium salt corresponds to the formula

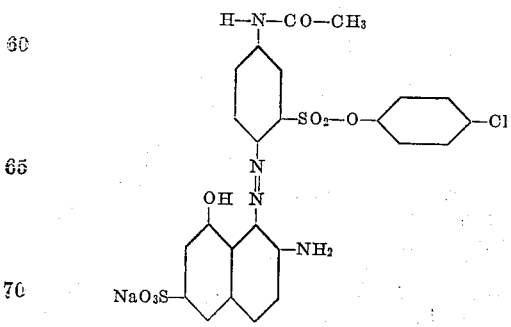

The dyestuff is a dark red powder, soluble in water to a blue-red solution and dyeing wool in an acid bath very pure blue red tints of pronounced fastness.

The same dyestuff may be made by reducing by means of sodium sulfide the product obtained as described in Example 2 from para-chlorophenol ester of 1-amino-4-nitrobenzene-2-sulfonic acid, and then acylating with acetic anhydride.

Dyestuffs which dye wool yellow to orange tints are obtained by using dialkylanilines, ethylbenzylaniline, diphenylamine, β-naphthol or salicylic acid, while the dyestuffs from 1-amino-5-hydroxynaphthalene-7-sulfonic acid or 1-tolylamino-8-naphthalene-sulfonic acid produce blue-red tints. The dyestuffs having instead of acetyl groups other acyl groups in the diazotizing component, such as, for example, formyl-, ω-chloracyl, propionyl, benzoyl, $$C=O(R=O\text{—alkyl or }NH_2)$$

possess similar properties.

EXAMPLE 4

422 parts of the para-cresol ester of 1-amino-4-acetylamine-2-benzene-sulfonic acid, sulfonated in the para-cresol nucleus, are diazotized in aqueous hydrochloric acid solution by means of 69 parts of sodium nitrite. The diazo-suspension is mixed with 171 parts of ethyl-β-naphthylamine, which is advantageously first converted into the hydrochloride or sulfate and the mixture is stirred with cautious addition of sodium acetate until the formation of dyestuff is complete. The dyestuff, if necessary after addition of sodium chloride, is filtered and dried. It is a dark red powder which dyes wool in an acid bath very pure fast red tints. Its sodium salt corresponds to the formula

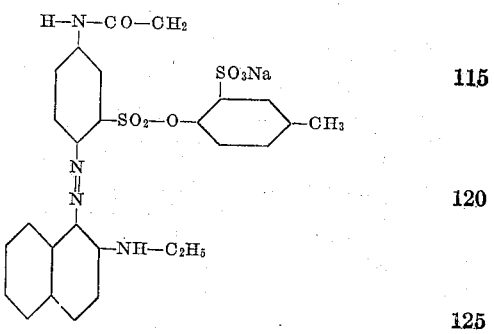

A similar very pure, blue dyestuff is obtained by using ethyl-α-naphthylamine, while β-naphthylamine, diphenylamine, β-naphthol and salicylic acid yield red to yellow dyestuffs. The para-cresol ester of 1-amino-4-acetylamine-2-benzene-sulfonic acid, sulfonated in the para-cresol nucleus, may be obtained by reducing the corresponding nitro-compound described in Example 2 to the corresponding amino-compound and acetylating the amino-group with acetic anhydride. The dyestuffs having instead of acetyl groups other acyl groups in the diazotizing component, such as, for example, formyl-, ω-chloracyl, propionyl, benzoyl, $$C=O(R=O\text{—alkyl or }NH_2)$$

possess similar properties.

EXAMPLE 5

2.5 parts of the dyestuff obtained as described in the second paragraph of Example 2 are dissolved in 1000 parts of water by boiling. The dye-bath is made up with 2500 parts of water of 50–60° C., whereupon the said dissolved dyestuff is added, 500 parts of water being added as rinsings. To the 4000 parts of this liquor there are added 10 parts of crystallized sodium sulfate and 100 parts of wool are introduced at 50–60° C. and thereupon 40 parts of acetic acid of 10 per cent. strength. The bath is heated gradually to 85–90° C. and dyeing continued for 1 hour at this temperature. The goods are then lifted, rinsed and dried. The wool is dyed intensely violet-blue.

EXAMPLE 6

2.5 parts of the dyestuff obtained as described in the first paragraph of Example 2 are dissolved in 1000 parts by volume of water. The dye-bath is made up with 2500 parts of water at 50–60° C., and the dissolved dyestuff is added thereto with addition of 500 parts of water as rinsings. To this dye-bath containing 4000 parts of liquor there are added 10 parts of crystallized sodium sulfate, and 100 parts of wool are introduced at 50–60° C. with subsequent addition of 40 parts of sulfuric acid of 10 per cent. strength. The bath is heated gradually to 85–90° C. and dyeing continued for 1 hour at this temperature. The goods are finished as usual and a very pure bluish-red dyeing of pronounced properties of fastness is obtained.

What I claim is:—

1. A process for the manufacture of azo-dyestuffs, consisting in coupling a diazo-compound of the general formula

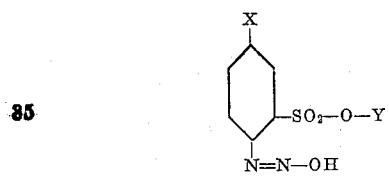

wherein X stands for a member selected from a group of substituents consisting of NO₂ and NH-acyl groups and Y for a nucleus of the benzene series, with such coupling components of the naphthalene series which, due to the presence of an NH-R group in the 2-position, R being H, alkyl, aralkyl or aryl, couple in the 1-position.

2. A process for the manufacture of azo-dyestuffs, consisting in coupling a diazo-compound of the general formula

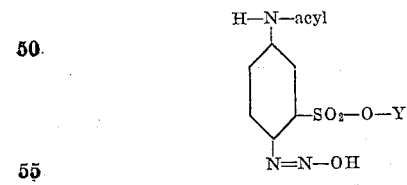

wherein Y stands for a nucleus of the benzene series, with such coupling components of the naphthalene series which, due to the presence of an NH-R group in the 2-position, R being H, alkyl, aralkyl or aryl, couple in the 1-position.

3. A process for the manufacture of azo-dyestuffs, consisting in coupling a diazo-compound of the general formula

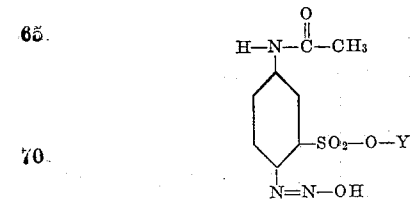

wherein Y stands for a nucleus of the benzene series, with such coupling components of the naphthalene series which, due to the presence of an NH-R group in the 2-position, R being H, alkyl, aralkyl or aryl, couple in the 1-position.

4. A process for the manufacture of azo-dyestuffs, consisting in coupling a diazo-compound of the general formula

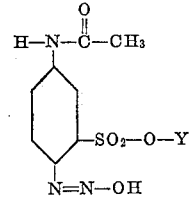

wherein Y stands for an unsulfonated nucleus of the benzene series, with the 2-amino-8-hydroxy-naphthalene-6-sulfonic acid.

5. A process for the manufacture of azo-dyestuffs, consisting in coupling a diazo-compound of the general formula

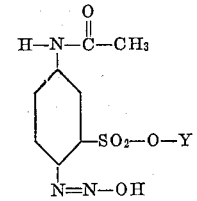

wherein Y stands for a sulfonated nucleus of the benzene series, with an N-alkyl-β-naphthylamine.

6. The azo-dyestuffs of the general formula

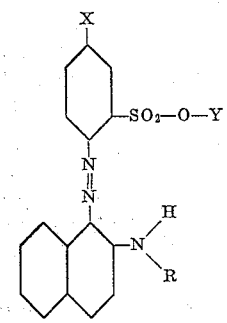

wherein X stands for a member selected from a group of substituents consisting of NO₂ and NH-acyl groups, Y for a nucleus of the benzene series, and R for H, alkyl, aralkyl or aryl, which products form dark powders which dissolve in solvents to red to violet and blue solutions.

7. The azo-dyestuffs of the general formula

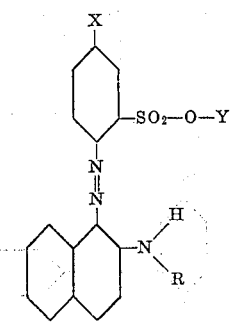

containing at least one sulfo group which is not in that aromatic nucleus which carries the substituent X, in which formula Y stands for a nucleus of the benzene series, X for a group of substituents consisting of NO₂ and NH-acyl groups, and R for H, alkyl, aralkyl or aryl, which products, in the form of the sodium salts are dark powders which dissolve in hot water to red to violet and blue solutions, and dye wool in an acid dye-bath fast red to violet and blue tints.

8. The azo-dyestuffs of the general formula

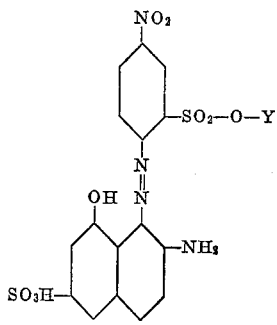

wherein Y stands for an unsulfonated nucleus of the benzene series, which products, in the form of the sodium salts, are dark powders which dissolve in hot water to blue solutions, and dye wool in an acid dye-bath fast blue tints.

9. The azo-dyestuffs of the general formula

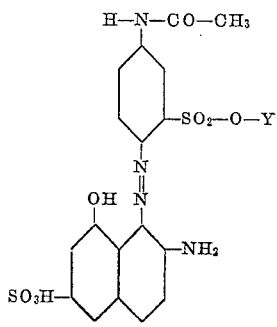

wherein Y stands for an unsulfonated nucleus of the benzene series, which products, in the form of the sodium salts, are dark powders which dissolve in hot water to red solutions, and dye wool in an acid dye-bath fast red tints particularly fast to light.

10. The azo-dyestuffs of the general formula

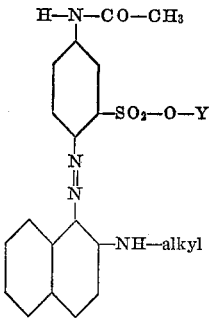

wherein Y stands for a sulfonated nucleus of the benzene series, which products, in the form of the sodium salts, are dark powders which dissolve in hot water to red solutions, and dye wool in an acid dye-bath fast red tints of great purity.

FRIEDRICH FELIX.